C. W. KELSEY.
SPRING RETARDING DEVICE.
APPLICATION FILED NOV. 15, 1905.
905,540.
Patented Dec. 1, 1908.
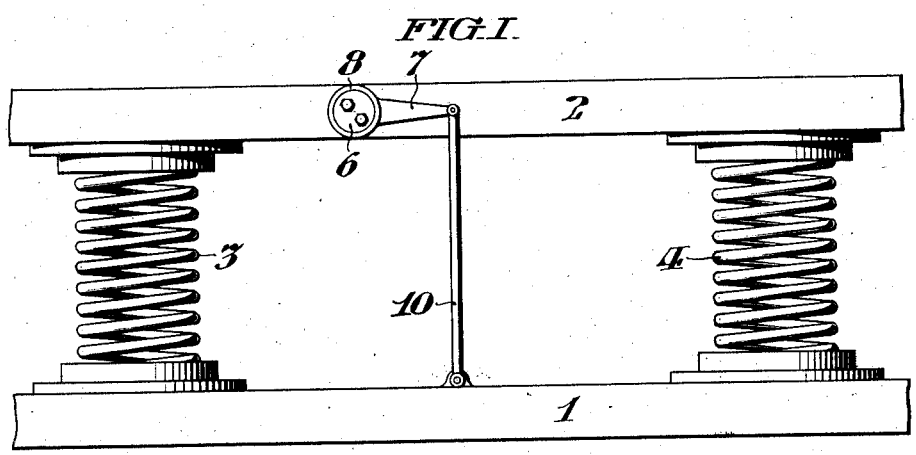
FIG. I.
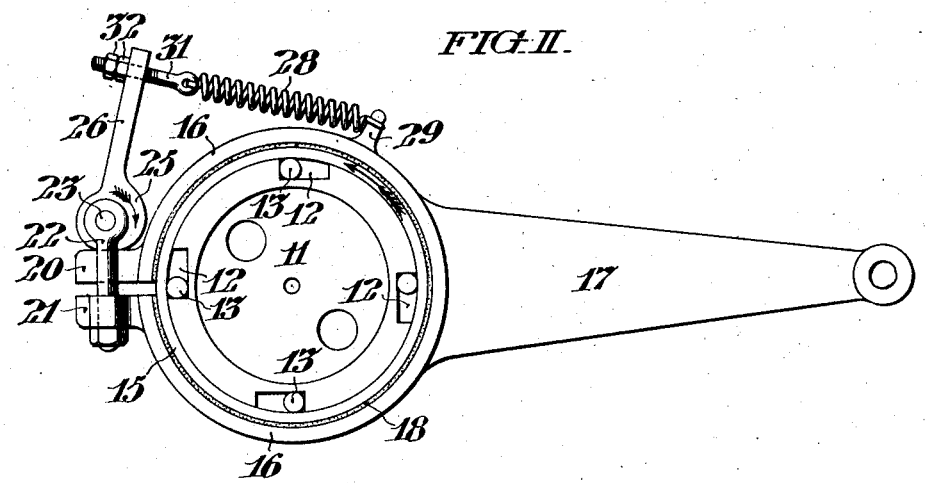
FIG. II.
WITNESSES:
Clifton C. Hallowell
John C. Bergner
INVENTOR:
CADWALLADER W. KELSEY,
by Paige, Paul & Foley
Attys.

UNITED STATES PATENT OFFICE.

CADWALLADER W. KELSEY, OF PHILADELPHIA, PENNSYLVANIA.

SPRING-RETARDING DEVICE.

No. 905,540.　　　　Specification of Letters Patent.　　　Patented Dec. 1, 1908.

Application filed November 15, 1905. Serial No. 287,407.

*To all whom it may concern:*

Be it known that I, CADWALLADER W. KELSEY, of Philadelphia, in the State of Pennsylvania, have invented certain new and useful Improvements in Spring-Retarding Devices, whereof the following is a specification, reference being had to the accompanying drawings.

My improvements are particularly applicable to automobiles and other vehicles, to prevent violent movements of the vehicle body by the spring or springs connecting said body with the vehicle wheel frame.

Devices for the purpose aforesaid are usually so constructed and arranged as to afford a retarding effect on the spring action both when the body and frame tend to approach each other, and when they tend to separate, and, the effect of the combination of such a retarding device with a vehicle spring is merely to apparently stiffen the latter and nullify its cushioning effect.

Therefore, it is the object of my invention to provide a retarding device for the purpose described, which shall permit free mobility of the spring in one direction and thus afford its full cushioning effect and only have a retarding effect upon the spring when the latter tends to move in the reverse direction. For instance, the form of my invention hereinafter described is so arranged that, when the body of the vehicle tends to move downward toward the wheel supporting frame, the springs between said body and frame are free to afford the full cushioning effect, but when under the reflex action of the springs the body tends to rise from said frame, the movement of the springs is so retarded as to prevent any violent upward movement of the vehicle body.

In the form of my invention hereinafter described, a circular drum is secured in rigid relation with the vehicle body with its axis horizontal; a lever pivotally connected with the wheel frame, by a link, is mounted to turn on said drum; and, clutching means are provided between said lever and drum, permitting the lever to turn freely with respect to the drum in one direction and to frictionally engage the drum in the other direction; so that when the vehicle body tends to approach the wheel frame the lever turns freely on the drum and permits such movement, unretarded, but when said body tends to rise from said frame, the lever frictionally engages said drum and retards such movement.

My invention comprises the various novel features of construction and arrangement hereinafter more definitely specified and claimed.

In the drawings, Figure I, is a fragmentary side view, diagrammatically indicating a vehicle wheel frame and body with my invention applied thereto. Fig. II, is an enlarged side elevation of a drum and clutch lever embodying my invention.

Referring to Fig. I,— 1, indicates the frame to which the supporting wheels of an automobile are secured, and 2, indicates a body member of said vehicle. The springs 3, and 4, operatively connect said relatively movable vehicle members 1, and 2. The circular drum 6, is secured to the member 2, with its axis in horizontal position, and, 7, is a lever provided with a ring 8, encircling said drum, and pivotally connected by the link 10, with said member 1. It will be seen that by this construction, the relation between the link and frame is a definite or constant relation, since as the frame moves up or down, the lever will also move up or down, being connected to said frame by the link 10.

As shown in Fig. II, the drum 11, which is in definite relation with the vehicle member 2, like the drum 6, above described, is provided with a series of tangential recesses 12, in its periphery, which are so proportioned as to present the rollers 13, in rolling contact with the ring 15, when said rollers 13, are seated in the larger ends of their respective recesses 12.

It is to be understood that the arrangement last described is such that the ring 15, may be turned freely in the direction of the arrow marked thereon, in Fig. II, with the effect of idly rotating said rollers 13, in the larger ends of their respective recesses 12, but, when it is attempted to turn said ring 15, in the reverse direction, said rollers 13, are shifted tangentially outward in their respective recesses and lock said ring in rigid relation with said drum. As shown in Fig. II, said ring 15, is interposed between the drum 11, and the jaws 16, of the lever 17, said jaws together constituting a split-ring. The lever 17 is connected to the frame 1, like the lever 7, above described, and said jaws are provided with a facing 18, of frictional material, for instance, vulcanized fiber, necessitating considerable stress to turn said lever 17, on said ring. As shown in Fig. II, said jaws 16, are provided with opposed lugs 20, 21, and the latter is provided with bearings 22, for the shaft 23, of the cam 25, which is so shaped that when turned in the direction of the arrow marked thereon, it tends to compress the jaws 16, upon said ring 15, to increase the frictional engagement of said jaws and ring. Said cam 25, is conveniently provided with the lever arm 26, which is connected by the spring 28, with the stud 29, on the lever jaw 16; the tension of said spring 28, being variable by means of the eye bolt 31, and nuts 32, which connect it with said cam arm 26. Said device is operated as follows:—Upon downward movement of the vehicle member 2, which supports said drum, the lever turns freely upward on said drum, the rollers 13, turning idly during such movement, thus permitting the approach of said member 2, toward the member 1, with the springs 3, and 4, freely mobile. However, any reverse movement tending to separate said vehicle members 1, and 2, tends to turn said lever downwardly on said drum, and occasions the rotary traverse of the rollers 13, to such an extent as to lock the ring 15, on the drum, so that continued movement of separation of the vehicle members 1, and 2, is retarded by the frictional engagement of the lever jaws upon said ring; such engagement being however instantly nullified by the initial movement of said lever in the reverse direction. Therefore, the arrangement described permits the springs 3, and 4, to support the body member 2, with their full cushioning effect, but prevents any violent movement of the vehicle body by said springs.

Although I find it convenient to secure the drum to the body member 2, of the vehicle, and to secure the lever to the wheel frame member of the vehicle as above described, it is to be understood that the result above described may be attained with the relative position of said members reversed.

Therefore, it is to be understood that I do not desire to limit myself to the precise details of construction and arrangement herein set forth, as it is obvious that various modifications may be made therein without departing from the essential features of my invention.

I claim:—

1. In a vehicle, the combination with a relatively movable spring-connected wheel frame and body; of a spring retarding device between said relatively movable members, arranged to permit free relative movement thereof in one direction, and to retard such movement in the other direction, comprising two concentric rings; means for adjusting the degree of friction between them, one of said rings being secured in definite relation to one of said relatively movable members; and means for connecting the other of said rings to the other of said relatively movable members to permit free motion of said other ring in one direction and positive engagement of said other ring in the other direction.

2. In a vehicle, the combination with a relatively movable spring connected wheel frame and body; of a spring retarding device between said relatively movable members arranged to permit free relative movement thereof in one direction and retard such movement in the other direction, comprising a drum secured in definite relation to one of said relatively movable members; a ring encircling said drum; rollers between said drum and said ring; a lever in frictional relation with the periphery of said ring, connected to the other of said relatively movable members; and means for varying the degree of friction between said ring and lever, substantially as set forth.

3. In a vehicle, the combination of a relatively movable spring connected wheel frame and body; of a spring retarding device between said frame and body arranged to permit free relative movement thereof in one direction and retard such movement in the other direction, comprising a drum secured in definite relation to one of said members; a ring encircling said drum; rollers interposed between said ring and drum arranged to permit free relative movement of said drum and ring in one direction and prevent such movement in the other direction; a lever encircling and frictionally engaging said ring; means for varying the degree of friction between said ring and lever; and means connecting said lever with the other of said members, substantially as set forth.

4. In a vehicle, the combination with a relatively movable spring-connected wheel frame and body; of a spring retarding device between said frame and body comprising a drum secured in definite relation to one of said relatively movable members; two concentric rings encircling said drum; means for adjusting the degree of friction between said rings; means whereby the rings may turn freely about said drum in one direction, but one of them positively engages said drum when moved in the other direction; and connections between said rings and the other of said relatively movable members, substantially as set forth.

5. In a vehicle, the combination with a relatively movable spring-connected wheel frame and body; of a spring retarding device between said frame and body comprising a drum secured in definite relation to one of said relatively movable members; two concentric rings encircling said drum; an adjustable clamping device for varying the degree of friction between said rings; means whereby the rings may turn freely about said drum in one direction, but one of them positively engages said drum when moved in the other direction; and connections between said rings and the other of said relatively movable members, substantially as set forth.

6. In a device of the class described, the combination with a drum provided with a tangential recess; of means preventing the rotation of said drum; a ring encircling said drum; a roller in said recess in contact with said drum and ring; a lever; and means frictionally engaging said lever with the periphery of said ring, substantially as set forth.

7. In a device of the class described, the combination with a drum provided with a tangential recess; of a ring encircling said drum; a roller in said recess in contact with said drum and ring; a lever; means frictionally engaging said lever with said ring, comprising opposed jaws on said lever; and, means arranged to resiliently compress said jaws toward said ring, substantially as set forth.

8. In a device of the class described, the combination with a drum provided with a tangential recess; of a ring encircling said drum; a roller in said recess in contact with said drum and ring; a lever; means frictionally engaging said lever with said ring, comprising opposed jaws on said lever encircling said ring; and, a facing of frictional material between said ring and lever, substantially as set forth.

9. In a device of the class described, the combination with a drum provided with a tangential recess; of a ring encircling said drum; a roller in said recess in contact with said drum and ring; a lever; means frictionally engaging said lever with said ring, comprising opposed jaws on said lever; and, means arranged to resiliently compress said jaws toward said ring, comprising a cam and a spring tending to rotate said cam, substantially as set forth.

10. In a device of the class described, the combination with a drum provided with a tangential recess; of a ring encircling said drum; a roller in said recess in contact with said drum and ring; a lever; means frictionally engaging said lever with said ring, comprising opposed jaws on said lever; and, means arranged to resiliently compress said jaws toward said ring, substantially as set forth.

11. In a device of the class described, the combination with a drum provided with a tangential recess; of a ring encircling said drum; a roller in said recess in contact with said drum and ring; a lever; means frictionally engaging said lever with said ring, comprising opposed jaws on said lever; and, means arranged to adjustably compress said jaws toward said ring, substantially as set forth.

In testimony whereof, I have hereunto signed my name, at Philadelphia, Pennsylvania, this 14th day of November, 1905.

CADWALLADER W. KELSEY.

Witnesses:
  JAMES H. BELL,
  E. L. FULLERTON.